United States Patent
Hirata (10) Patent No.: US 9,780,469 B2
(45) Date of Patent: Oct. 3, 2017

(54) CARD CONNECTOR ENABLING THE USE OF VARIOUS TYPES OF CARDS

(71) Applicant: Molex, LLC, Lisle, IL (US)

(72) Inventor: Toshihisa Hirata, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/151,199

(22) Filed: May 10, 2016

(65) Prior Publication Data

US 2016/0359247 A1    Dec. 8, 2016

(30) Foreign Application Priority Data

May 19, 2015    (JP) ................................. 2015-101725

(51) Int. Cl.
*H01R 24/00* (2011.01)
*H01R 12/71* (2011.01)
*G06K 7/00* (2006.01)
*H01R 12/70* (2011.01)

(52) U.S. Cl.
CPC ......... *H01R 12/714* (2013.01); *G06K 7/0047* (2013.01); *G06K 7/0056* (2013.01); *H01R 12/7005* (2013.01)

(58) Field of Classification Search
CPC    H01R 12/721; H01R 23/6873; H01R 13/635; H01R 12/72; H01R 12/7076; H01R 13/6335
USPC ........ 439/630, 607.31, 946, 607.22; 235/441
See application file for complete search history.

(56) References Cited

U.S. PATENT DOCUMENTS

| | | | | |
|---|---|---|---|---|
| 7,494,381 B1* | 2/2009 | Wu | ...................... | H01R 12/714 439/630 |
| 7,967,640 B2* | 6/2011 | Hashimoto | .......... | H01R 12/714 439/630 |
| 9,490,557 B2* | 11/2016 | Wang | ..................... | G06K 13/08 |
| 9,515,400 B2* | 12/2016 | Zeng | .................. | H01R 12/7076 |
| 2010/0178807 A1* | 7/2010 | Hashimoto | .......... | H01R 12/714 439/630 |

FOREIGN PATENT DOCUMENTS

| | | |
|---|---|---|
| CN | 204304030 U | 4/2015 |
| CN | 204361314 U | 5/2015 |
| JP | 2008-108455 A | 5/2008 |
| JP | 2010-161012 A | 7/2010 |

* cited by examiner

*Primary Examiner* — Hae Moon Hyeon
(74) *Attorney, Agent, or Firm* — James A. O'Malley (57) ABSTRACT

A card connector is provided for receiving an inserted card module. The card connector includes a housing including a terminal holding portion for arranging terminals to make contact with electrode pads on the card module. Each terminal includes a base portion held by the terminal holding portion and a cantilevered arm portion extending from the base portion in an inclined direction relative to the transverse direction of the housing. Each arm portion includes a curved portion and a pair of inclined portions. The curved portion has a curved profile with a curved surface positioned so the center of curvature is positioned above. The inclined portions are inclined relative to the extension direction of the arm portion on both sides of the apex portion positioned at the free end. The inclined portions each have a different angle of inclination relative to the extension direction of the arm portion.

7 Claims, 9 Drawing Sheets

CARD CONNECTOR ENABLING THE USE OF VARIOUS TYPES OF CARDS

RELATED APPLICATIONS

This application claims priority to Japanese Application No. 2015-101725, filed May 19, 2015, which is incorporated herein by reference in its entirety.

TECHNICAL FIELD

The present disclosure relates to a card connector.

BACKGROUND ART

Electronic devices such as mobile phones include a card connector enabling the use of various types of cards such as SIM (Subscriber Identity Module) cards.

As electronic devices become smaller, cards and card connectors become smaller, and the terminals on the card connectors become smaller too. In response, card connectors have been proposed which have triangular terminals that sufficiently increase the amount of elastic displacement despite their smaller size (see, for example, Patent Document 1).

Figure 9:
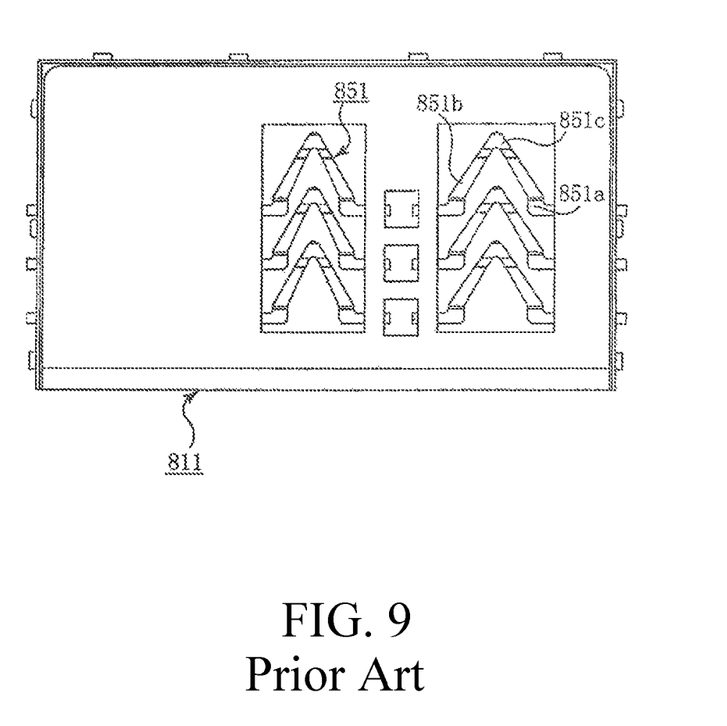
FIG. 9 is a diagram showing a card connector of the prior art.

FIG. 9 is a diagram showing a card connector of the prior art.

In these drawings, 811 is the housing in the card connector made of an insulating resin material. The bottom wall of the housing 811 has a total of six terminals 851 arranged in two rows of three. Each terminal 851 has the profile of an isosceles triangle, and includes a contact portion 851c positioned at the apex portion of the isosceles triangle, a pair of arm portions 851b corresponding to a pair of sides, and a base portion 851a embedded and supported at least partially in the bottom wall of the housing 811.

In each terminal 851, when viewed from the side before a card has been inserted, the contact portion 851c is positioned above the bottom wall of the housing 811, and the arm portions 851b extend linearly in an inclined direction from the base portion 851a to the contact portion 851c. Note that the contact portion 851c has a curved shape which bulges upward.

Patent Document 1—Laid-Open Patent Publication No. 2010-161012

SUMMARY

However, in a card connector of the prior art, each terminal 851 is arranged so that the contact portion 851c corresponding to the apex portion of the isosceles triangle faces upwards in FIG. 9, that is, each terminal 851 faces the card insertion direction. As a result, the card can be inserted smoothly. However, when the card is ejected, the inevitable protrusions on the uneven bottom surface of the card become caught on the contact portions 851c and terminals 851 are sometimes damaged.

The present disclosure provides a card connector in which the card module is kept from becoming caught on terminals when the card module is inserted and ejected, thereby improving reliability.

The present disclosure provides a card connector for receiving an inserted card module having electrode pads on one surface, the card connector comprising a housing including a terminal holding portion for arranging terminals to make contact with the electrode pads on the card module, each terminal including a base portion held by the terminal holding portion and a cantilevered arm portion extending from the base portion in an inclined direction relative to the transverse direction of the housing in plan view, and each arm portion including a curved portion having a curved profile with a curved surface positioned so the center of curvature is positioned above in side view, and a pair of inclined portions inclined relative to the extension direction of the arm portion on both sides of the apex portion positioned at the free end, the inclined portions each having a different angle of inclination relative to the extension direction of the arm portion.

In another card connector of the present disclosure, each arm portion extends in plan view from the base portion in an inclined direction forward in the insertion direction of the card module relative to the transverse direction of the housing.

In another card connector of the present disclosure, one of the inclined portions is inclined in plan view so as to approach the apex portion forward in the insertion direction of the card module, and the other inclined portion is inclined in plan view so as to approach the apex portion rearward in the insertion direction of the card module.

In another card connector of the present disclosure, each arm portion further includes a flat portion connected to the base portion and extending parallel to the upper surface of the terminal holding portion in plan view, and a forward portion connected to the leading end of the curved portion, including the apex portion, and positioned above the upper surface of the terminal holding portion.

In another card connector of the present disclosure, each inclined portion includes a section positioned above the upper surface of the terminal holding portion.

In another card connector of the present disclosure, the width dimension of the section of the arm portion extending from the inclined portions to the base portion gradually increases in linear fashion towards the base portion.

In another card connector of the present disclosure, each arm portion includes an opening passing through the arm portion in the thickness direction.

The present disclosure is able to provide a card connector in which the card module is kept from becoming caught on terminals when the card module is inserted and ejected, thereby improving reliability.

BRIEF DESCRIPTION OF THE DRAWINGS

FIGS. 5A-5C are a set of diagrams showing the card connector in the first embodiment of the present disclosure with the shell removed, in which

FIGS. 6A-6F are a set of diagrams used to explain the changes in the contact state between the primary terminals on the card connector and the card in the first embodiment of the present disclosure, in which

FIGS. 7A and 7B are a pair of diagrams showing the card connector with the shell removed in the second embodiment of the present disclosure, in which

FIGS. 8A-8C are a set of diagrams showing the card connector with the shell removed in the third embodiment of the present disclosure, in which

DETAILED DESCRIPTION OF THE PREFERRED EMBODIMENTS

The following is a detailed description of embodiments of the present disclosure with reference to the drawings.

In the drawings, 102 is the card module inserted into a card connector 1 mounted on a board inside an electronic device (not shown). In other words, the card module 102 is mounted in the electronic device via the card connector 1. The electronic device may be any type of device, including a personal computer, a mobile phone, a smartphone, a communication modem, a tablet, a digital camera, a video camera, a music player, a gaming console, or a car navigation system.

The card module 102 can be any type of memory card such as a SIM card, a microSIM card, MMC® multimedia card, SD® secure digital card, miniSD® card, xD-Picture® card, Memory Stick®, Memory Stick Duo®, Smart Media®, or Trans-Flash® memory card. The card module 102 may also be a card adapter having a shape and dimensions suitable for insertion into the card connector 1 in order to house a memory card, such as an SD® card adapter for housing a mini SD® card. In addition, the card module 102 may be a card tray having a shape and dimensions suitable for insertion into the card connector 1 in order to house a memory card. In summary, the card module 102 may be any type of module that can be inserted into the card connector 1 and that can establish an electrical connection with an electronic device via the card connector 1.

Figure 3:
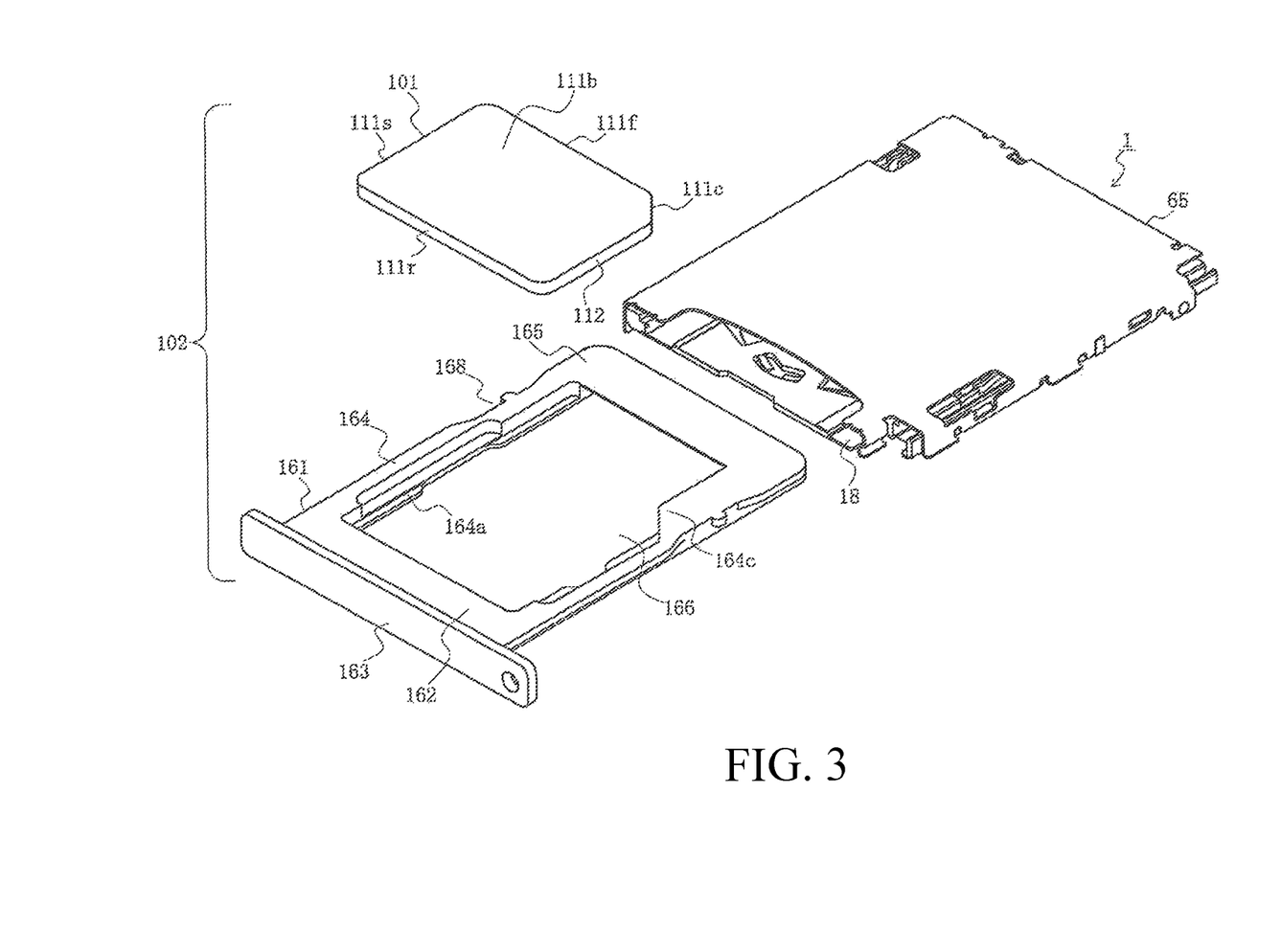
FIG. 3 is a perspective view of the card tray and the card connector in the first embodiment of the present disclosure.
Figure 4:
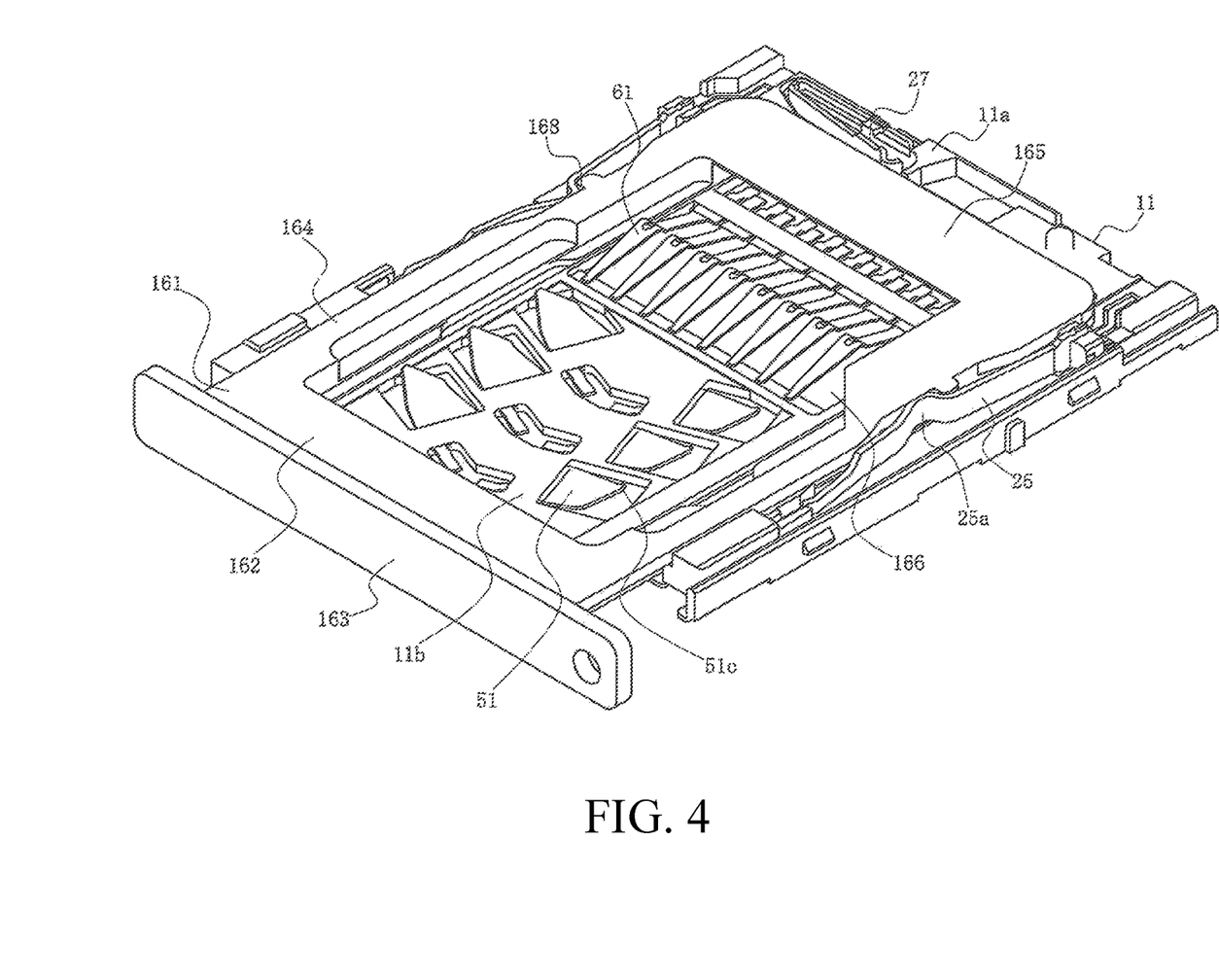
FIG. 4 is a perspective view of the first embodiment of the present disclosure showing the card tray inserted into the card connector with the shell removed.

For the sake of convenience, the card module 102 in the explanation of the present embodiment is a card tray 161 housing and holding a card 101 as shown in FIG. 3. The card 101 can be any type of card such as a SIM card, a microSIM card, MMC® multimedia card, SD® secure digital card, miniSD® card, xD-Picture® card, Memory Stick®, Memory Stick Duo®, Smart Media®, or Trans-Flash® memory card. In the explanation of the present embodiment, however, the card 101 is either a microSD® card or a nanoSIM card. The SD Card Association, which is the standard setting body for SD® cards, has set the size of microSD cards at 15 mm×11 mm×1.0 mm (L×W×D). In accordance with the ETSI TS 102 221 V11.00 card standard, the nanoSIM card has a longitudinal length of 12.3 mm, a width of 8.8 mm, and a thickness of 0.67 mm. In the present disclosure, the card 101 is a nanoSIM card.

In the present embodiment, as shown in FIG. 3, the card 101, which is a nanoSIM card, has a substantially rectangular band-like shape defined by a front end 111f and a rear end 111r, and a pair of left and right side ends 111s connecting both ends of the front end 111f and both ends of the rear end 111r. Electrode pads serving as the terminal members (not shown) are arranged in two rows of three along the left and right side ends 111s on a front surface (not shown). In other words, the two rows of electrode pads extend in the longitudinal direction of the card 101. Electrode pads are not provided on the rear surface 111b opposite the front surface. A notched portion 111c is formed as a recessed portion in one of the corners at which a side end 111s comes into contact with the left or right end of the front end 111f, more specifically, in the front right corner portion on the rear surface 111b.

In the present embodiment, the expressions indicating direction, such as upper, lower, left, right, front and rear, which are used to explain the configuration and operation of each portion of the card connector 1, card module 102, card tray 161, and card 101 are relative and not absolute. They depend on the orientation of the card connector 1, card module 102, card tray 161, and card 101, and their constituent components shown in the drawings. When the orientation of the card connector 1, card module 102, card tray 161, and card 101 or their constituent components change, the interpretation changes in response to the change in orientation.

The card tray 161 is a substantially plate-like member including a metal member integrally formed by stamping and bending a metal plate, and a resin portion made of an insulating resin covering and becoming integrated with a portion of the metal portion using a molding technique such as insert molding or overmolding. However, the card tray 161 may also be made exclusively of metal or exclusively of resin.

The card tray 161 has a front frame portion 165 and a rear frame portion 162 extending in the transverse direction and defining a front and rear of a card accommodating recessed portion 166, and a pair of side frame portions 164 extending in the longitudinal direction, connecting both ends of the rear frame portion 162 and the front frame portion 165, and defining the front and rear of the card accommodating recessed portion 166. A rear panel portion 163 is integrally formed in a rear surface of the rear frame portion 162. A holding recessed portion 168 is formed in an outer surface of each side frame portion 164 to hold and secure the card tray 161 inserted into the card connector 1.

The card accommodating recessed portion 166 is a substantially rectangular space in plan view which passes through the card tray 161 from top to bottom. When a card 101 is housed inside the card accommodating recessed portion 166, side surfaces 112 of the card 101 face inner surfaces of the front frame portion 165, the rear frame portion 162, and the side frame portions 164, and the front surface including the electrode pads is exposed on a lower surface of the card tray 161. Eaves portions 164a are formed at any number of locations on the inner surfaces of the front frame portion 165, the rear frame portion 162, and the side frame portions 164 in order to support the front surface of the card 101 accommodated inside the card accommodating recessed portion 166.

A protruding portion 164c is formed in a corner of the card tray 161, more specifically, a front right corner, where one of the side frame portions 164 is connected to the front frame portion 165. The protruding portion 164c functions as a card orientation restricting portion. As shown in the drawing, when the card 101 has the proper orientation, the card 101 is allowed to be housed inside the card tray 161. However, when the card 101 does not have the proper orientation, the card 101 is not allowed to be housed inside the card tray 161. In other words, the card 101 cannot be housed inside the card accommodating recessed portion 166. Therefore, the card 101 cannot be inserted into and housed in the card accommodating recessed portion 166 inside the card tray 161 when oriented improperly, that is, when inserted upside-down or backwards.

Figure 1:
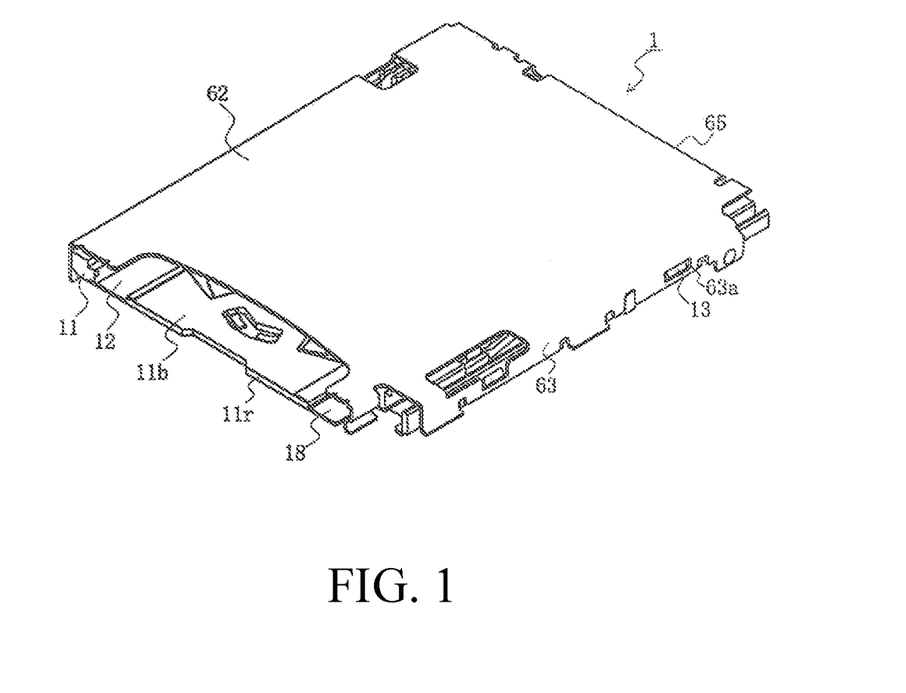
FIG. 1 is a perspective view of the card connector in the first embodiment of the present disclosure.
Figure 2:
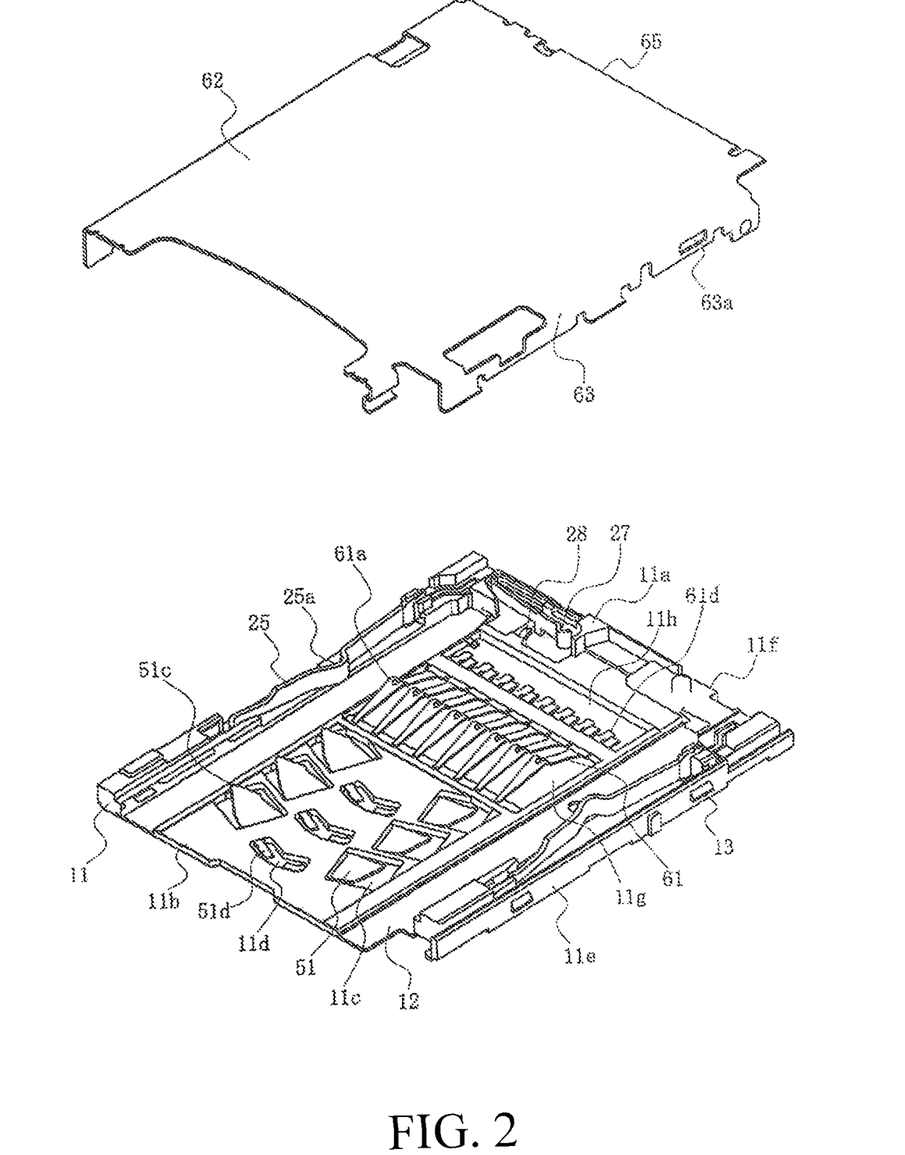
FIG. 2 is an exploded perspective view of the card connector in the first embodiment of the present disclosure.

The card connector 1 has a housing 11 integrally molded from an insulating material such as a synthetic resin, and a shell 65 or cover member formed integrally by punching and bending a conductive metal sheet which is attached to an upper side of the housing 11. The shell 65 has a substantially rectangular ceiling panel portion 62 and side panel portions 63 erected on side edges of the ceiling panel portion 62, and covers the housing 11 and at least some of the upper portion of the card tray 161 inserted into the housing 11 and the card connector 1. A plurality of locking openings 63a are formed in the side panel portions 63. When the shell 65 is mounted on top of the housing 11, the locking openings 63a engage latching protrusions 13 formed on outer side surfaces of the side wall portions 11e of the housing 11 to secure the shell 65 to the housing 11. The card connector 1 has a substantially parallelepiped shape, and is mounted on the surface of a board such as a printed circuit board in the electronic device. The card tray 161 is inserted into an insertion slot 18 defined in a rear of the card connector 1 (below left in FIG. 1). More specifically, the card tray 161 is inserted into the card insertion space between the housing 11 and the shell 65.

The housing 11 includes primary terminals 51, secondary terminals 61, and a lower shell 12 integrally formed by stamping and bending a metal plate. This substantially plate-like member is integrally molded using a molding technique such as insert molding or overmolding with an insulating resin which covers and becomes integrated with at least a portion of the primary terminals 51, secondary terminals 61, and the lower shell 12. The lower shell 12 is a frame member for reinforcing the housing 11, and is preferably formed from the same material as the primary terminals 51 and/or secondary terminals 61, but is separate from and electrically insulated from the primary terminals 51 and the secondary terminals 61.

The housing 11 also includes a bottom wall portion 11b serving as the substantially rectangular, plate-like terminal holding portion, an inner wall portion 11a which is thicker than the bottom wall portion 11b and which extends in the transverse direction of the housing 11 along the front end portion 11f in the insertion direction (longitudinal direction) of the card tray 161, and a pair of side wall portions 11e which are thicker than the bottom wall portion 11b and which extend in the insertion direction of the housing 11 along both side edges. Lower surfaces of the inner wall portion 11a and the side wall portions 11e are flush with a lower surface of the bottom wall portion 11b, and upper surfaces of the inner wall portion 11a and the side wall portions 11e are above an upper surface of the bottom wall portion 11b. An end portion of the housing 11 in the insertion direction of the card tray 161 is referred to as the rear end portion 11r.

Here, the bottom wall portion 11b includes a primary terminal holding recessed portion 11c and secondary terminal holding recessed portions 11g for holding the exposed portions of the primary terminals 51 and the secondary terminals 61, as well as a primary terminal solder tail opening 11d and secondary terminal solder tail openings 11h. The primary terminal holding recessed portion 11c, the secondary terminal holding recessed portions 11g, the primary terminal solder tail opening 11d, and the secondary terminal solder tail openings 11h are openings which pass through the bottom wall portion 11b in the thickness direction.

The primary terminal holding recessed portions 11c and the primary terminal solder tail openings 11d are arranged side-by-side in rows extending in the longitudinal direction of the housing 11. In the example shown in the drawing, the primary terminal holding recessed portions 11c are arranged in two rows of three. At least a portion of each primary terminal 51 is embedded in the bottom wall portion 11b, and an apex portion 51c is exposed inside the primary terminal holding recessed portion 11c. A solder tail portion 51d of each primary terminal 51 to be soldered is also exposed inside the primary terminal solder tail opening 11d. Therefore, the primary terminals 51 housed in the primary terminal holding recessed portions 11c are also arranged in two rows that extend in the longitudinal direction of the housing 11. Each apex portion 51c is biased upwards by the spring action of the primary terminal 51, and comes into contact with the corresponding electrode pad on the card 101 inside the card tray 161 held inside the card connector 1. Each solder tail portion 51d is soldered to a connecting pad (not shown) connected to a conductive trace on the board to establish a reliable electrical connection with the conductive trace.

There is a single secondary terminal holding recessed portion 11g and secondary terminal solder tail opening 11h, and the secondary terminals 61 are arranged side by side to form a single row extending in the transverse direction of the housing 11. At least a portion of each secondary terminal 61 is embedded in the bottom wall portion 11b, and a contact portion 61a of each secondary terminal 61 is exposed inside the secondary terminal holding recessed portion 11g. A solder tail portion 61d of each secondary terminal 61 to be soldered is also exposed inside the secondary terminal solder tail opening 11h. Each contact portion 61a is biased upwards by the spring action of the secondary terminal 61, and comes into contact with the corresponding electrode pad on the card 101 inside the card tray 161 held inside the card connector 1. Each solder tail portion 61d is connected electrically by solder to a signal line, contact pad, or terminal formed on a printed circuit board.

The primary terminals 51 are arranged so as to match the electrode pads on a microSD® card, and the secondary terminals 61 are arranged so as to match the electrode pads on a nanoSIM® card. In other words, the card connector 1 can accommodate different types of cards 101 in the card tray 161. For example, it can accommodate a card 101 that is a microSD® card or a nanoSIM® card. The number and arrangement of primary terminals 51 and secondary terminals 61 can be changed if necessary to conform to the number and arrangement of electrode pads on a card 101. When the card tray 161 can only accommodate a single type of card 101, either the primary terminals 51 or the secondary terminals 61 can be omitted.

The lower shell 12 is exposed between the bottom wall portion 11b and the left and right side wall portions 11e. A holding spring member 25 is arranged on the inside of each side wall portion 11e to hold and secure the card tray 161. Each holding spring member 25 is a slender band-shaped spring member extending in the longitudinal direction, and a holding protrusion 25a is formed near a center of each holding spring member 25 and protrudes inwardly in the transverse direction of the housing 11. Each holding protrusion 25a engages the holding recessed portion 168 on the card tray 161 and this holds and secures the card tray 161 inserted into the card connector 1.

The housing 11 includes a movable member 27 and a fixed member 28 for the detection switch used to detect if a card tray 161 inserted into the card connector 1 has reached a predetermined position (the position where the card tray 161 is held by the holding spring member 25 and where the apex portion 51c of each primary terminal 51 makes contact with the corresponding electrode pad on the card 101 when a nanoSIM card 101 is housed inside the card tray 161). Because the movable member 27 and the fixed member 28 contact each other when the card tray 161 has not reached the predetermined position, the detection switch is electrified or turned ON. However, when the card tray 161 reaches the predetermined position, the movable member 27 makes contact with and presses against the front frame portion 165 of the card tray 161, and this displaces and separates the movable member 27 from the fixed member 28. Because the detection switch is no longer electrified and turned OFF, the presence of the card tray 161 at the predetermined position is detected.

The following is a detailed description of the configuration of the primary terminal 51.

Figures 5A, 5B, 5C:
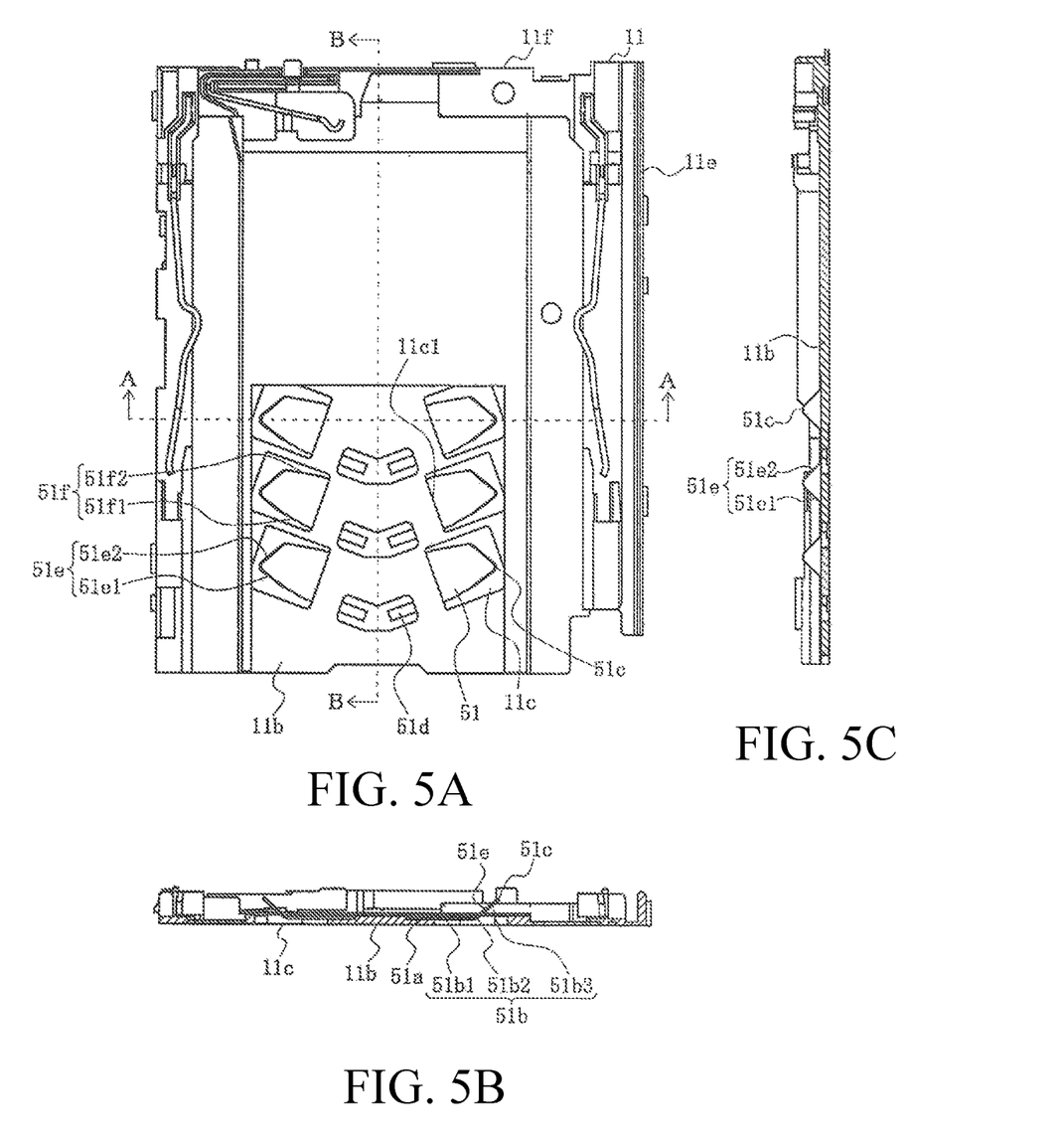
FIG. 5A is a plan view.
FIG. 5B is a cross-sectional view from A-A in FIG. 5A.
FIG. 5C is a cross-sectional view from B-B in FIG. 5A.

As shown in FIGS. 5A-5C, the base portion 51a of each primary terminal 51 is at least partially embedded on the bottom wall portion 11b, the solder tail portion 51d is exposed inside the solder tail opening 11d, and the rest is exposed inside the terminal holding recessed portion 11c. In FIGS. 5A-5C, for the sake of convenience, depiction of the secondary terminals 61, the secondary terminal holding recessed portions 11g, and the secondary terminal solder tail openings 11h has been omitted.

The arm portion 51b is connected at a base end thereof to the base portion 51a, is elastically deformable, has a constant thickness, and functions as a cantilever. When external force is not being applied in the initial state, the arm portion 51b has the shape shown in FIGS. 5A-5C. More specifically, as shown in FIG. 5B, the arm portion 51b has a plate-like flat panel portion 51b1 formed on the same plane as the base portion 51a and extending parallel to the upper surface of the bottom wall portion 11b, a curved portion 51b2 connected to the leading end of the flat panel portion 51b1 and shaped so as to have a curved surface with a center of curvature positioned upwards in side view, and a forward portion 51b3 connected to the leading end of the curved portion 51b2 and positioned above the upper surface of the bottom wall portion 11b. The forward portion 51b3 may have a linear shape or may have a section with the same curved shape as the curved portion 51b2. In the initial state, the arm portion 51b has a shape in side view which does not include an inflection point but is connected linearly to the base portion 51a.

As shown in FIG. 5A, the arm portion 51b has a pentagonal shape similar to home plate in baseball when viewed from above, and the apex portion 51c positioned at the apex faces in an inclined direction forward in the insertion direction of the card tray 161 relative to the transverse direction of the housing 11. Each terminal 51 is arranged so as to be transverse with respect to the insertion direction of the card 101 or card tray 161, and each arm portion 51b extends from the base portion 51a in an inclined direction forward in the insertion direction of the card tray 161 relative to the transverse direction of the housing 11. Each arm portion 51b can extend from the base portion 51a in an inclined direction rearward in the insertion direction of the card tray 161 relative to the transverse direction of the housing 11. However, here, for the sake of convenience, they extend in an inclined direction forward in the insertion direction of the card tray 161 relative to the transverse direction of the housing 11.

In the example in the drawing, each primary terminal holding recessed portion 11c is rectangular when viewed from above. However, the linear side 11c1 positioned towards the center in the transverse direction of the housing 11 is not parallel to the insertion direction of the card tray 161 but rather inclined with respect to the insertion direction of the card tray 161. A central axis of the primary terminals 51 extends in the direction orthogonal to the side 11c1. In other words, the primary terminals 51 are arranged on an incline relative to the transverse direction of the housing 11 so that the leading end is closer to the front end portion 11f and the rear end is closer to the rear end portion 11r. Therefore, the solder tail portions 51d extend in an inclined direction rearward in the insertion direction of the card tray 161 relative to the transverse direction of the housing 11.

Because the primary terminals 51 are inclined relative to the transverse direction of the housing 11 when viewed from above, the overall length can be extended if there are dimensional constraints in the transverse direction of the housing 11 compared to a situation in which the terminals extend parallel to the transverse direction of the housing 11, thereby increasing the spring length of the cantilevered arm portions 51b.

An inclined portion 51e is formed on both sides of the apex portion 51c positioned on the leading end (free end) of each arm portion 51b. Each inclined portion 51e includes a first inclined portion 51e1 positioned to the rear in the insertion direction of the card tray 161 and a second inclined portion 51e2 positioned to the front in the insertion direction of the card tray 161. The first inclined portion 51e1 and the second inclined portion 51e2 are both inclined relative to the transverse direction of the housing 11, but the angle of inclination relative to the axial direction of the arm portion 51b is different. The first inclined portion 51e1 is inclined so as to approach the front in the insertion direction of the card tray 161 closer to the apex portion 51c, and the second inclined portion 51e2 is inclined so as to approach the rear in the insertion direction of the card tray 161 closer to the apex portion 51c.

The inclined portions 51e extend at least the full range of the forward portion 51b3, but a portion does not have to extend as far as the curved portion 51b2. In plan view, the apex portion 51c preferably comes to a point. However, it preferably has a rounded point.

The side edge portions 51f of each arm portion 51b are also inclined relative to the axial direction of the primary terminal 51. The side edge portions 51f include a first side edge portion 51f1 positioned to the rear in the insertion direction of the card tray 161 and a second side edge portion 51f2 positioned to the front in the insertion direction of the card tray 161. The degree to which the side edge portions 51f are inclined relative to the axial direction of the primary terminals 51 is equal to or less than that of the inclined portions 51e. Therefore, in the example shown in the drawing, the first side edge portion 51f1, as in the case of the first inclined portion 51e1, is inclined so as to approach the front in the insertion direction of the card tray 161 closer to the apex portion 51c, and the second side edge portion 51f2, opposite the case of the second inclined portion 51e2, is inclined so as to approach the front in the insertion direction of the card tray 161 closer to the apex portion 51c.

By inclining the side edge portions 51f in this manner, the width dimension of the arm portion 51b from the inclined portions 51e to the base portion 51b gradually increases in a linear fashion from the leading end to the base end. In this way, the constant-thickness cantilevered arm portion 51b, which has the shape of an isosceles triangle in plan view, approximates a uniform-strength beam applying uniform bending stress along the axis in the longitudinal direction.

The apex portion 51c functions as the contact portion of the primary terminal 51 and is biased upwards by the spring action of the arm portion 51b so as to make contact with the corresponding electrode pad on the card 101 inside the card tray 161 inserted into the card connector 1.

The following is an explanation of the operations performed by a card connector 1 with this configuration.

First, when the card tray 161 is inserted into the card connector 1, the user manually inserts the card tray 161 housing a card 101 functioning as the card module 102 into the insertion slot 18 in the rear of the card connector 1.

Here, the card tray 161 is inserted properly with the upper surface facing upwards towards the ceiling panel portion 62 of the shell 65, the lower surface facing downwards towards the bottom wall portion 11b of the housing 11, and the front frame portion 165 facing the front end portion 11f of the housing 11. As a result, the rear surface 111b of the card 101 housed inside the card accommodating recessed portion 166 which does not include any electrode pads faces upwards, and the lower surface including electrode pads and exposed on the lower surface of the card tray 161 is facing downwards.

The card 101 is a nanoSIM card. Explanation of the situation when the card 101 is a microSD® card has been omitted.

When the user pushes the card tray 161 into the insertion slot 18, the card tray 161 advances into the card insertion space formed between the shell 65 and the housing 11 towards the front end portion 11f and reaches a predetermined position.

Figure 6A:
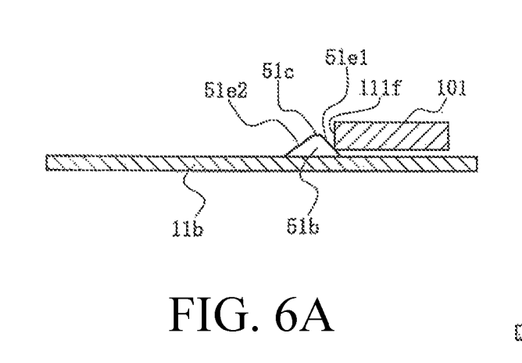
FIGS. 6A, 6B and 6C are lateral cross-sectional views at each state of the card tray insertion process.
Figure 6B:
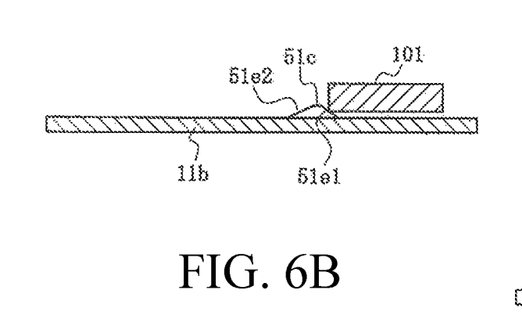
Figure 6C:
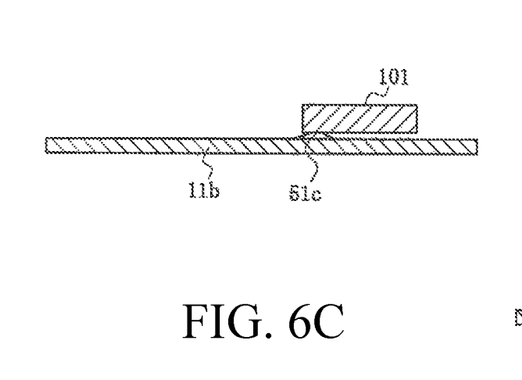

At this time, more specifically, each primary terminal 51 comes into contact with the card 101 and, as shown in FIGS. 6A-6C, are gradually deformed elastically. In FIGS. 6A-6F, for the sake of convenience in this explanation, the card tray 161 has been omitted and only the card 101 is depicted. In FIGS. 6A-6C, the insertion direction for the card 101 is to the left.

First, as shown in FIG. 6A, the lower end of the front end 111f of the card 101 comes into contact with the first inclined portion 51e1 in the arm portion 51b of the primary terminal 51. As explained above, the forward portion 51b3 of the arm portion 51b is positioned above the upper surface of the bottom wall portion 11b and the first inclined portion 51e1 and the second inclined portion 51e2 are present in the entire range of the forward portion 51b3. As a result, the lower end of the front end 111f of the card 101 inserted with the bottom surface running along the upper surface of the bottom wall portion 11b always makes contact with the first inclined portion 51e1.

Next, when the card 101 moves towards the front end portion 11f, the lower end of the front end 111f of the card 101 moves while maintaining contact with the first inclined portion 51e1 as shown in FIG. 6B. In other words, it slides over the first inclined portion 51e1, and the forward portion 51b3 of the arm portion 51b is pressed down and even more elastically displaced. At this time, because the first inclined portion 51e1 is inclined forward in the insertion direction of the card tray 161 closer to the apex portion 51c, that is, closer to the front end portion 11f, the lower end of the front end 111f of the card 101 does not experience much resistance and slides smoothly over the first inclined portion 51e1 towards the front end portion 11f.

Next, when the card 101 moves even further towards the front end portion 11f, as shown in FIG. 6C, the lower end of the front end 111f of the card 101 passes over the apex portion 51c, and the apex portion 51c slides along the downward-facing surface of the card 101. The forward portion 51b3 of the arm portion 51b is no longer displaced downward. Even when the forward portion 51b3 is displaced downwardly by the inserted card 101, the arm portion 51b is positioned above the lower surface of the bottom wall portion 11b and does not protrude below the lower surface. Therefore, even when the lower surface makes contact with the upper surface of the board, the arm portion 51b does not make contact with the conductive traces exposed on the surface of the board and no short-circuiting occurs.

Finally, when the card tray 161 reaches the predetermined position, the holding protrusions 25a on the pair of left and right holding spring members 25 engage the holding recessed portions 168 on the card tray 161. In this way, the card tray 161 is held stable and locked at the position corresponding to the predetermined position and cannot be displaced to the rear. When the card tray 161 reaches the position corresponding to the predetermined position, the front frame portion 165 interferes with the inner wall portion 11a of the housing 11. As a result, the card tray 161 cannot move forward any further.

When the card tray 161 reaches the predetermined position, the movable member 27 of the detection switch moves away from the fixed member 28. Because this turns OFF the detection switch, the presence of the card tray 161 at the predetermined position is detected.

The following is an explanation of the operations performed to eject the card tray 161 from the card connector 1.

First, the user manually grasps the rear panel portion 163 of the card tray 161 and pulls out the card tray 161 from a predetermined position. At this time, because the holding recessed portions 168 on the card tray 161 disengage from the holding protruding portions 25a on the holding spring members 25, there is resistance caused by the spring action of the elastically deformed holding spring members 25, but this resistance is not as great as the manual pressure applied by the user, and the card tray 161 is displaced to the rear against the resistance. The switch is turned ON, and it is detected that the card tray 161 has retreated from the predetermined position.

The card tray 161 can be inserted into and ejected from the card connector 1 whether it is housing the card 101 or not housing the card 101. In this situation, however, the front frame portion 165 of the card tray 161 sometimes comes into contact with the primary terminals 51. When the card tray 161 is inserted into the card connector 1, the primary terminals 51 come into contact with the front frame portion 165. They also come into contact with the card 101 as shown in FIGS. 6A-6C, but further explanation has been omitted. In the following explanation, the primary terminals 51 come into contact with the front frame portion 165 when the card tray 161 is ejected from the card connector 1.

Figure 6D:
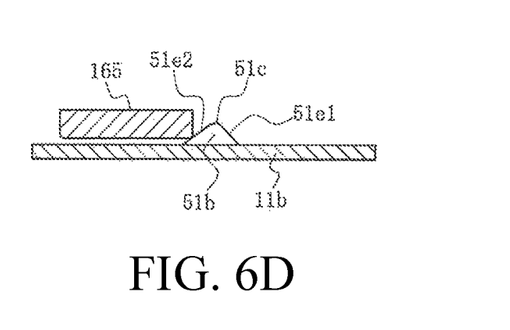
FIGS. 6D, 6E and 6F are lateral cross-sectional views of each stage of the card tray ejection process.

First, as shown in FIG. 6D, the lower end of the front frame portion 165 of the card tray 161 comes into contact with the second inclined portion 51e2 on the arm portion 51b of the primary terminals 51. As mentioned above, the forward portion 51b3 on the arm portion 51b is positioned above the upper surface of the bottom wall portion 11b, and the first inclined portion 51e1 and the second inclined portion 51e2 extend over the entire range of the forward portion 51b3. Therefore, the rear lower end of the front frame portion 165 of the retreating card tray 161 makes contact with the second inclined portion 51e2 such that the lower surface moves along the upper surface of the bottom wall portion 11b.

Figure 6E:
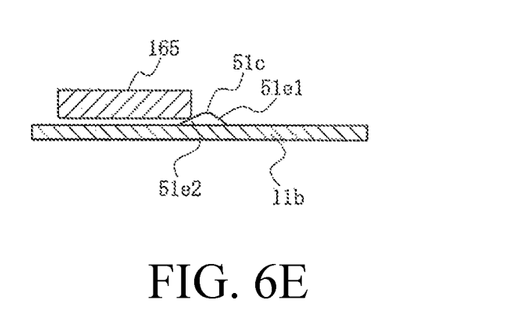

Next, when the card tray 161 retreats towards the rear end portion 11r, the rear lower end of the front frame portion 165 of the card tray 161, as shown in FIG. 6E, retreats while maintaining contact with the second inclined portion 51e2. In other words, because it slides along the second inclined portion 51e2, the forward portion 51b3 of the arm portion 51b is pushed down and elastically deformed downward. Because the second inclined portion 51e2 is inclined rearward in the insertion direction of the card tray 161 closer to the apex portion 51c, that is, closer to the rear end portion 11r, the rear lower end of the front frame portion 165 of the card tray 161 slides smoothly over the second inclined portion 51e2 without experiencing significant resistance and can retreat towards the rear end portion 11r.

Figure 6F:
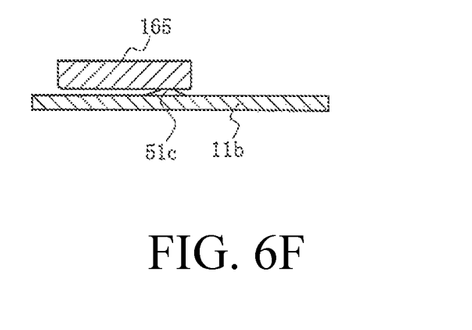

Next, when the card tray 161 retreats further towards the rear end portion 11r, the rear lower end of the front frame portion 165 of the card tray 161 passes over the apex portion 51c as shown in FIG. 6F. As a result, the apex portion 51c rubs along the lower surface of the front frame portion 165. The forward portion 51b3 of the arm portion 51b is not displaced downward any further.

When the card tray 161 has been pulled from the card connector 1 and removed, the arm portions 51b of the primary terminals 51 return to their original shape.

In the present embodiment, the card connector 1 receives an inserted card module 102 having electrode pads on one surface. The card connector 1 has a housing 11 including a bottom wall portion 11b in which are arranged primary terminals 51 for making contact with the electrode pads on the card module 102. Each primary terminal 51 includes a base portion 51a held by the bottom wall portion 11b, and a cantilevered arm portion 51b extending from the base portion 51a in an inclined direction relative to the transverse direction of the housing 11. Each arm portion 51b includes a curved portion 51b2 having a curved profile with a curved surface positioned so the center of curvature is positioned above in side view, and a pair of inclined portions 51e inclined relative to the extension direction of the arm portion 51b on both sides of the apex portion 51c positioned at the free end, the inclined portions 51e each have a different angle of inclination relative to the extension direction of the arm portion 51b.

Therefore, even though there are protruding portions and angular portions on the surface of the card module 102, these protruding portions and angular portions make contact with the inclined portions 51e and slide over the inclined portions 51e without becoming caught on the arm portions 51b when the card module 102 is inserted or ejected. Because the arm portions 51b extend in an inclined direction relative to the transverse direction of the housing 11, the spring length of the cantilevered arm portions 51b can be extended. Therefore, the spring action of the arm portions 51b can be maintained, strong contact pressure is applied to the electrode pads, the card module 102 can be inserted and ejected smoothly, and the terminals 51 are not damaged or plastically deformed. The result is a more reliable card connector 1. When the card module 102 is a card tray 161 holding a card 101, the card tray 161 is sometimes inserted into the card connector 1 without a card 101. When an empty card tray 161 is inserted and ejected, the front frame portion 165 of the card tray 161 may come into contact with the arm portions 51b. However, when this occurs, the front frame portion 165 comes into contact with the inclined portions 51e and slides over the inclined portions 51e without getting caught on the arm portions 51b.

In plan view, each arm portion 51b extends from the base portion 51a in the forward insertion direction of the card module 102 at an incline relative to the transverse direction of the housing 11. In plan view, the first inclined portion 51e1 is inclined forward in the insertion direction of the card module 102 closer to the apex portion 51c, and the second inclined portion 51e2 is inclined rearward in the insertion direction of the card module 102 closer to the apex portion 51c. Therefore, when the card module 102 is inserted or ejected, the protruding portions and angular portions of the card module 102 can smoothly slide over the first inclined portion 51e1 or the second inclined portion 51e2 without getting caught on the arm portions 51b.

Also, each arm portion 51b further includes a flat portion 51b1 connected to the base portion 51a and extending parallel to the upper surface of the bottom wall portion 11b in plan view, and a forward portion 51b3 connected to the leading end of the curved portion 51b2, including the apex portion 51c, and positioned above the upper surface of the bottom wall portion 11b. Because each apex portion 51c comes into contact with an electrode pad on the card module 102 in this way, each apex portion 51c can be expected to have a wiping effect on the surface of the electrode pads when the card module 102 is inserted and ejected, thereby cleaning the surfaces of the electrode pads and ensuring a reliable electrical connection between the terminals 51 and the electrode pads.

Each inclined portion 51e includes a section that is positioned above the upper surface of the bottom wall portion 11b. Because the inserted card module 102 makes reliable contact with these inclined portions 51e, it slides over the inclined portions 51e and does not become caught on the arm portions 51b.

Also, the width dimension of the section of each arm portion 51b extending from the inclined portions 51e to the base portion 51a gradually increases in linear fashion towards the base portion 51a. In this way, each arm portion 51b functions as a uniform-strength beam applying uniform bending stress in the extending direction.

The following is an explanation of a second embodiment of the present disclosure. All structural elements identical to those in the first embodiment are denoted by the same reference numbers and further explanation of these elements has been omitted. Explanation of all operations and effects identical to those in the first embodiment has also been omitted.

Figure 7A:
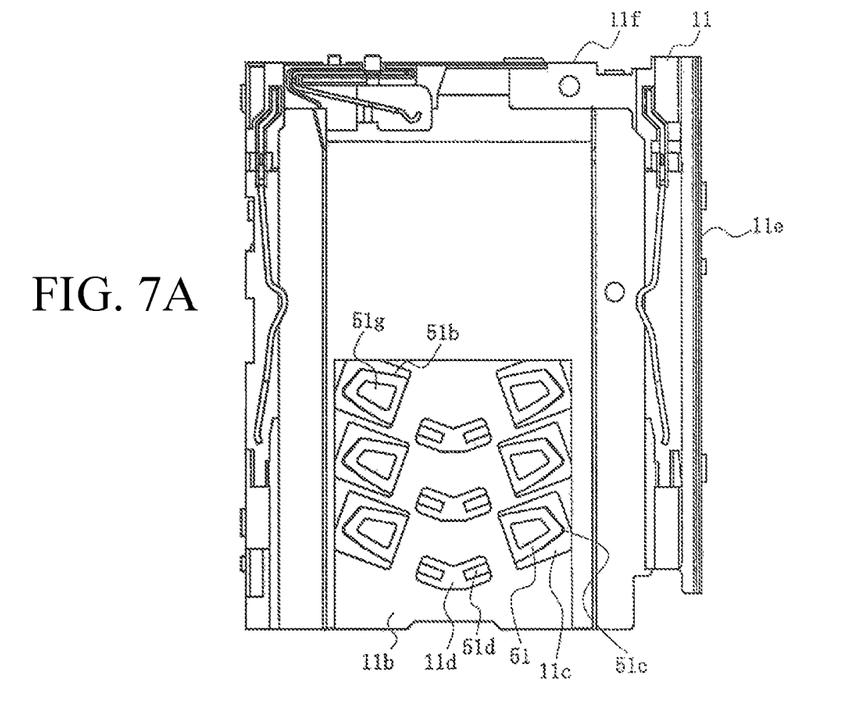
FIG. 7A is a plan view and FIG. 7B is a perspective view.
Figure 7B:
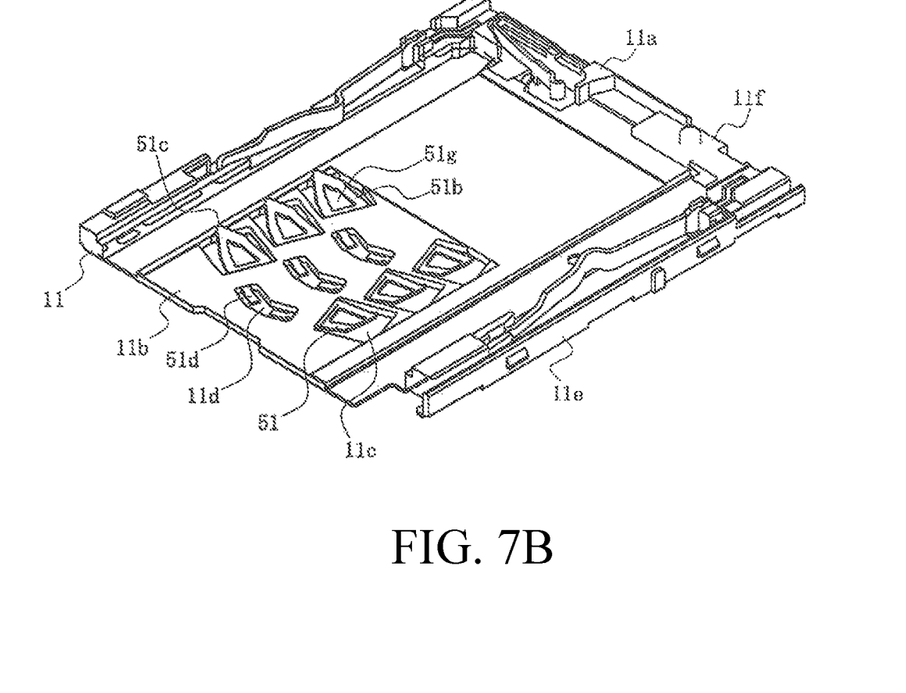

In the present embodiment, as shown in FIGS. 7A and 7B, an opening 51g is formed in the center of the arm portion 51b of each primary terminal 51 which passes through the arm portion 51b in the thickness direction. In FIGS. 7A and 7B, for the sake of convenience, depiction of the secondary terminals 61, the secondary terminal holding recessed portions 11g, and the secondary terminal solder tail openings 11h has been omitted.

In the example shown in the drawings, openings 51g have a shape similar to the external profile of the arm portions 51b. However, any shape can be used. Formation of openings can be used to adjust the rigidity of the arm portions 51b and adjust the spring constants of the cantilevered arm portions 51b.

All other configuration elements of the card connector 1 are identical to those in the first embodiment, so further explanation of these elements has been omitted. All operations of the card connector 1 are identical to those of the first embodiment, so further explanation of these elements has been omitted.

The following is an explanation of a third embodiment of the present disclosure. All structural elements identical to those in the first embodiment and the second embodiment are denoted by the same reference numbers and further explanation of these elements has been omitted. Explanation of all operations and effects identical to those in the first embodiment and the second embodiment has also been omitted.

Figures 8A, 8C:
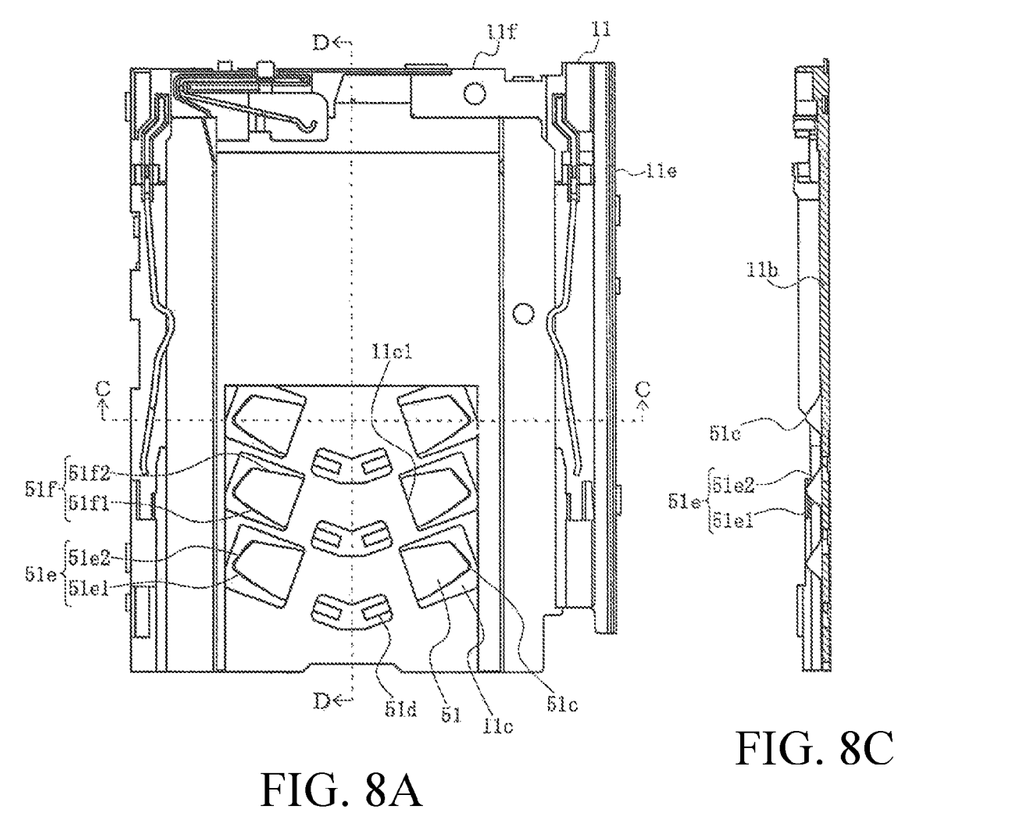
FIG. 8A is a plan view.
FIG. 8C is a cross-sectional view from D-D in FIG. 8A.
Figure 8B:
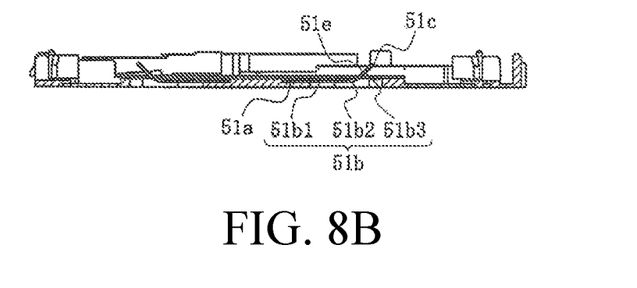
FIG. 8B is a cross-sectional view from C-C in FIG. 8A.

In FIGS. 8A-8C, as in the first embodiment, the base portion 51a of each primary terminal 51 is at least partially embedded on the bottom wall portion 11b, the solder tail portion 51d is exposed inside the solder tail opening 11d, and the rest is exposed inside the terminal holding recessed portion 11c. In FIGS. 8A-8C, for the sake of convenience, depiction of the secondary terminals 61, the secondary terminal holding recessed portions 11g, and the secondary terminal solder tail openings 11h has been omitted.

As shown clearly in FIG. 8B, the curvature radius of the curved portion 51b2 of each primary terminal 51 in the present embodiment is greater than the curvature radius in the first embodiment. In other words, the curved portions 51b2 of the arm portions 51b of the primary terminals 51 in the present embodiment have a gentler curve. Therefore, when the arm portions 51b come into contact with the card tray 161 and the card 101 and are elastically deformed, the stress is distributed over a wider area and does not become concentrated.

All other configuration elements of the card connector 1 are identical to those in the first embodiment, so further explanation of these elements has been omitted. All operations of the card connector 1 are identical to those of the first embodiment, so further explanation of these elements has been omitted.

The present disclosure is not limited to the embodiments described above. Variations based on the spirit of the disclosure are possible, and these do not depart from the scope of the present disclosure.

The present disclosure can be applied to a card connector.

The invention claimed is:

1. A card connector for receiving an inserted card module having electrode pads on one surface, the card connector comprising
    a housing having a front end portion and a rear end portion, the housing configured to receive the inserted card module therein via the rear end portion, the housing including a terminal holding portion between the front and rear end portions, the terminal holding portion defining a centerline thereof which extends from the front end portion to the rear end portion; and
    a plurality of terminals which are configured to make contact with the electrode pads on the card module, each terminal including a base portion, an arm portion and an apex portion, the base portion being held by the terminal holding portion, the arm portion extending from the base portion to the apex portion, each terminal being provided at a non-perpendicular angle relative to the centerline of the terminal holding portion whereby the base portion is positioned closer to the rear end portion of the housing and a portion of the arm portion is positioned closer to the front end portion of the housing, the apex portion being non-planar with the base portion.

2. The card connector according to claim 1, wherein each arm portion further includes a flat portion, a curved portion, and a forward portion, the curved portion being provided between the flat and forward portions, the flat portion being connected to the base portion and being planar with the base portion, the forward portion extending from the curved portion to the apex portion.

3. The card connector according to claim 1, wherein each arm portion includes an opening passing through the arm portion.

4. The card connector according to claim 1, wherein the arm portion has first and second side edge portions and first and second inclined portions, the first side edge portion extending forwardly and outwardly from a rearward portion of the base portion to the first inclined portion, the first inclined portion extending forwardly and outwardly from the first side edge portion to the apex portion, the second side edge portion extending forwardly and outwardly from a forward portion of the base portion to the second inclined portion, and the second inclined portion extending rearwardly and outwardly from the second side edge portion to the apex portion.

5. The card connector according to claim 4, wherein a configuration of the first and second side edge portions, respectively, result in a width of the arm portion decreasing between the connection of the arm portion to the base portion and the connections of the first and second side edge portions to the first and second inclined portions, respectively.

6. The card connector according to claim 4, wherein the terminal holding portion has a terminal holding recessed portion, and wherein the arm portion and the apex portion of the terminal is positioned within and exposed in the terminal holding recessed portion.

7. The card connector according to claim 6, wherein the terminal holding recessed portion is generally rectangular in configuration, and wherein the arm portion and the apex portion are generally rectangular in configuration.

\* \* \* \* \*